United States Patent
Malek

(10) Patent No.: US 6,785,775 B1
(45) Date of Patent: Aug. 31, 2004

(54) USE OF A CACHE COHERENCY MECHANISM AS A DOORBELL INDICATOR FOR INPUT/OUTPUT HARDWARE QUEUES

(75) Inventor: Robert M. Malek, White Bear Township, MN (US)

(73) Assignee: Unisys Corporation, Blue Bell, PA (US)

( * ) Notice: Subject to any disclaimer, the term of this patent is extended or adjusted under 35 U.S.C. 154(b) by 258 days.

(21) Appl. No.: 10/101,407

(22) Filed: Mar. 19, 2002

(51) Int. Cl.[7] .................................. G06F 12/00
(52) U.S. Cl. ................ 711/141; 711/118; 711/122; 711/142; 711/143; 711/146; 710/22; 710/100
(58) Field of Search ............... 710/22, 100; 711/118, 711/122, 141, 142, 143, 146

(56) References Cited

U.S. PATENT DOCUMENTS

| | | | |
|---|---|---|---|
| 4,056,844 A | 11/1977 | Izumi .......................... | 364/200 |
| 4,349,871 A | 9/1982 | Lary ........................... | 364/200 |
| 4,442,487 A | 4/1984 | Fletcher et al. ............. | 364/200 |
| 4,525,777 A | 6/1985 | Webster et al. ............. | 364/200 |
| 4,755,930 A | 7/1988 | Wilson, Jr. et al. ......... | 364/200 |
| 4,794,521 A | 12/1988 | Ziegler et al. .............. | 364/200 |
| 4,807,110 A | 2/1989 | Pomerence et al. ......... | 364/200 |
| 4,843,542 A | 6/1989 | Dashiell et al. ............. | 364/200 |
| 5,023,776 A | 6/1991 | Gregor ........................ | 364/200 |
| 5,025,365 A | 6/1991 | Mathur et al. .............. | 364/200 |
| 5,025,366 A | 6/1991 | Baror ......................... | 364/200 |
| 6,480,500 B1 * | 11/2002 | Erimli et al. ............... | 370/412 |
| 6,598,144 B1 * | 7/2003 | Bailey et al. ............... | 711/203 |
| 6,611,883 B1 * | 8/2003 | Avery .......................... | 710/22 |
| 6,681,293 B1 * | 1/2004 | Solomon et al. ............ | 711/122 |
| 6,704,831 B1 * | 3/2004 | Avery .......................... | 710/310 |

\* cited by examiner

*Primary Examiner*—T Nguyen
(74) *Attorney, Agent, or Firm*—Charles A. Johnson; Mark T. Starr; Nawrochi, Rooney & Siverston, P.A.

(57) ABSTRACT

A method of and apparatus for improving the scheduling efficiency of a data processing system using the facilities which maintain coherency of the system's level cache memories. These efficiencies result from monitoring the cache memory lines which indicate invalidation of a cache memory entry because of a storage operation within backing memory. This invalidity signal is utilized to generate a doorbell type interface indication of a new application entry within the work queue.

25 Claims, 8 Drawing Sheets

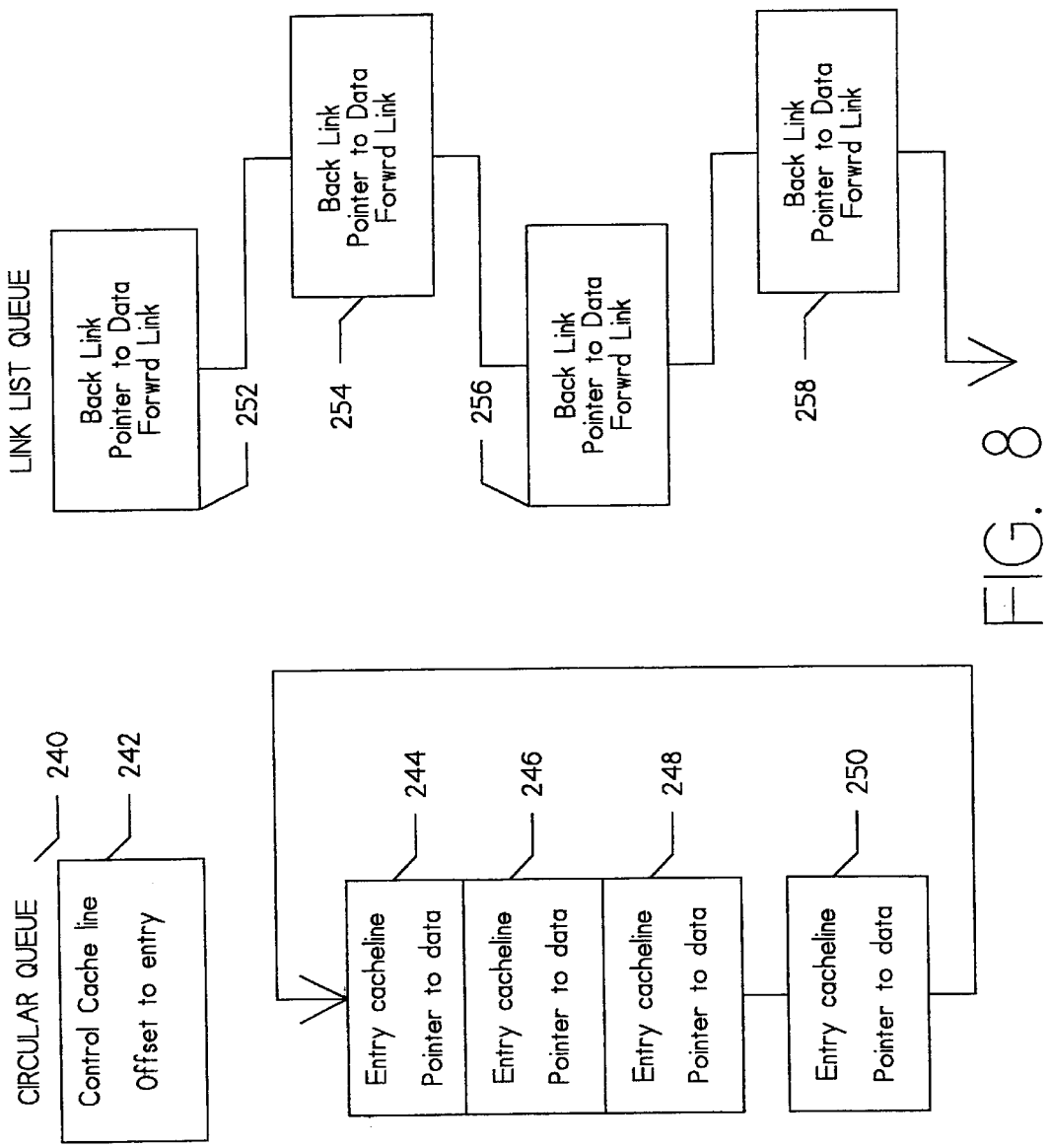

USE OF A CACHE COHERENCY MECHANISM AS A DOORBELL INDICATOR FOR INPUT/OUTPUT HARDWARE QUEUES

CROSS REFERENCE TO CO-PENDING APPLICATIONS

The present application is related to co-pending U.S. patent application Ser. No. 09/748,535, filed Dec. 22, 2000, entitled "Use of a Cache Ownership Mechanism to Synchronize Multiple Dayclocks" assigned to the assignee of the present invention and incorporated herein by reference.

BACKGROUND OF THE INVENTION

1. Field of the Invention

The present invention relates generally to data processing systems employing multiple instruction processors and more particularly relates to multiprocessor data processing systems employing a hardware doorbell type interface to indicate a new entry on a server work queue.

2. Description of the Prior Art

It is known in the art that the use of multiple instruction and input/output processors operating out of common memory can produce problems associated with the processing of obsolete memory data by a first processor after that memory data has been updated by a second processor. The first attempts at solving this problem tended to use logic to lock processors out of memory spaces being updated. Though this is appropriate for rudimentary applications, as systems become more complex, the additional hardware and/or operating time required for the setting and releasing of locks can not be justified, except for security purposes. Furthermore, reliance on such locks directly prohibits certain types of applications such as parallel processing.

The use of hierarchical memory systems tends to further compound the problem of data obsolescence. U.S. Pat. No. 4,056,844 issued to Izumi shows a rather early approach to a solution. The system of Izumi utilizes a buffer memory dedicated to each of the processors in the system. Each processor accesses a buffer address array to determine if a particular data element is present in its buffer memory. An additional bit is added to the buffer address array to indicate invalidity of the corresponding data stored in the buffer memory. A set invalidity bit indicates that the main storage has been altered at that location since loading of the buffer memory. The validity bits are set in accordance with the memory store cycle of each processor.

U.S. Pat. No. 4,349,871 issued to Lary describes a bussed architecture having multiple processing elements, each having a dedicated cache memory. According to the Lary design, each processing unit manages its own cache by monitoring the memory bus. Any invalidation of locally stored data is tagged to prevent use of obsolete data. The overhead associated with this approach is partially mitigated by the use of special purpose hardware and through interleaving the validity determination with memory accesses within the pipeline. Interleaving of invalidity determination is also employed in U.S. Pat. No. 4,525,777 issued to Webster et al.

Similar bussed approaches are shown in U.S. Pat. No. 4,843,542 issued to Dashiell et al, and in U.S. Pat. No. 4,755,930 issued to Wilson, Jr. et al. In employing each of these techniques, the individual processor has primary responsibility for monitoring the memory bus to maintain currency of its own cache data. U.S. Pat. No. 4,860,192 issued to Sachs et al, also employs a bussed architecture but partitions the local cache memory into instruction and operand modules.

U.S. Pat. No. 5,025,365 issued to Mathur et al, provides a much enhanced architecture for the basic bussed approach. In Mathur et al, as with the other bussed systems, each processing element has a dedicated cache resource. Similarly, the cache resource is responsible for monitoring the system bus for any collateral memory accesses which would invalidate local data. Mathur et al, provide a special snooping protocol which improves system throughput by updating local directories at times not necessarily coincident with cache accesses. Coherency is assured by the timing and protocol of the bus in conjunction with timing of the operation of the processing element.

An approach to the design of an integrated cache chip is shown in U.S. Pat. No. 5,025,366 issued to Baror. This device provides the cache memory and the control circuitry in a single package. The technique lends itself primarily to bussed architectures. U.S. Pat. No. 4,794,521 issued to Ziegler et al, shows a similar approach on a larger scale. The Ziegler et al, design permits an individual cache to interleave requests from multiple processors. This design resolves the data obsolescence issue by not dedicating cache memory to individual processors. Unfortunately, this provides a performance penalty in many applications because it tends to produce queuing of requests at a given cache module.

The use of a hierarchical memory system in a multiprocessor environment is also shown in U.S. Pat. No. 4,442,487 issued to Fletcher et al. In this approach, each processor has dedicated and shared caches at both the $L_1$ or level closest to the processor and at the $L_2$ or intermediate level. Memory is managed by permitting more than one processor to operate upon a single data block only when that data block is placed in shared cache. Data blocks in dedicated or private cache are essentially locked out until placed within a shared memory element. System level memory management is accomplished by a storage control element through which all requests to shared main memory (i.e. $L_3$ level) are routed. An apparent improvement to this approach is shown in U.S. Pat. No. 4,807,110 issued to Pomerene et al. This improvement provides prefetching of data through the use of a shadow directory.

A further improvement to Fletcher et al, is seen in U.S. Pat. No. 5,023,776 issued to Gregor. In this system, performance can be enhanced through the use of store around $L_1$ caches used along with special write buffers at the $L_2$ intermediate level. This approach appears to require substantial additional hardware and entails yet more functions for the system storage controller.

Inherent in architectures which employ cache memory, is that the storage capacity is substantially less than the memory located at lower levels in the hierarchy. As a result, memory locations within the cache memory must often be cleared for use by other data quantities more recently needed by the instruction processor. For store-in cache memories, this means that those quantities modified by the instruction processor must first be rewritten to system memory before the corresponding location is available to store newly requested data. This "flushing" process tends to delay the availability of the newly requested data. Newer Input/Output interface protocols, such as InfiniBand, require the use of queue structures in main system memory to hold work request entries and a Doorbell type interface to inform the hardware that a new entry has been added. For best performance both the queue data and the Doorbell are to be located in the virtual address space of the application. There can be many applications with multiple work queues each, in typical system, that a single hardware unity will support.

Current state of the art for hardware Doorbells requires a single memory mapped register allocated on a software page boundary (typically 4k bytes) so the Operating System can manage the location in its normal virtual-to-physical address translation mechanism. This results in the waste of most of the page space needed for each Doorbell including a very large memory mapped space assigned to the hardware when multiple queues are in use. A lesser used option is to not use Doorbell but to require the hardware to poll each queue for flags indicating added entries. This requires additional memory bandwidth of the polling and increases the time between a single queue being investigated based on the is number of queues enabled.

SUMMARY OF THE INVENTION

The present invention overcomes the problems found in the prior art by providing a method of and apparatus for the cache memory coherency hardware to assist in generating the Doorbell type indication within a server platform.

The preferred mode of the present invention includes up to four main memory storage units. Each is coupled directly to each of up to four "pod"s. Each pod contains a level three cache memory coupled to each of the main memory storage units. Each pod may also accommodate up to two input/output modules.

Each pod may contain up to two sub-pods, wherein each sub-pod may contain up to two instruction processors. Each instruction processor has two separate level one cache memories (one for instructions and one for operands) coupled through a dedicated system controller, having a second level cache memory, to the level three cache memory of the pod.

Each instruction processor has a dedicated system controller associated therewith. A is separate dayclock is located within each system controller.

Unlike many prior art systems, both level one and level two cache memories are dedicated to an instruction processor within the preferred mode of the present invention. The level one cache memories are of two types. Each instruction processor has an instruction cache memory and an operand cache memory. The instruction cache memory is a read-only cache memory primarily having sequential access. The level one operand cache memory has read/write capability. In the read mode, it functions much as the level one instruction cache memory. In the write mode, it is a semi-store-in cache memory, because the level two cache memory is also dedicated to the instruction processor.

In accordance with the present invention, the level two cache memory is of the store-in type. Therefore, the most current value of an operand which is modified by the corresponding instruction processor is first located within the level two cache memory. When the replacement algorithm for the level two cache memory determines that the location of that operand must be made available for newly requested data, that operand must be "flushed" into the lower level memory to avoid a loss of the most current value.

Waiting for flushing of the old data before requesting the new data induces unacceptable latency. Therefore, according to the present invention, a flush buffer is provided for temporary storage of the old data during the flushing process. Though this temporary storage appears at first to be a mere extension to the level two storage capacity, it greatly enhances efficiency because the flush process really does not need to utilize the level two cache memory.

The old data is moved from the level two cache memory to the flush buffer as soon as the replacement algorithm has determined which data to move, and the newly requested data is requested from the lower level memory. The flush process subsequently occurs from the flush buffer to the lower level of memory without further reference to the level two cache. Furthermore, locations within the level two cache memory are made available for the newly requested data well before that data has been made available from the lower level memory.

In accordance with the preferred mode of the present invention, the hardware that handles the work queue is called a host channel adaptor (HCA), which is able to handle thousands of work queues at the same time. As the external interface speed increases, it may be incorporated closer into the systems memory controller/crossbar structure. An example of an HCA is an InfiniBand Host Channel Adaptor.

The use of Doorbells to alert the HCA of an entry on a queue is a commonly used procedure. Currently the use of a memory mapped register requires the reservation of a full memory page in order to assign the virtual address. With hundreds or thousands of queue pairs planned this can result in the use of a lot of potentially wasted pages, in addition to managerial frustration. When the HCA is fully integrated into the chip set, several alternatives are possible. A preferred option is to utilize the system coherency protocol, where the system cache uses a Modified/Exclusive/Shared/Invalid (MESI) type protocol for coherency.

Because the HCA maintains a copy of a cache line, anytime a processor updates (requests ownership) of the cache line, the HCA is informed via a snoop/purge operation. The hardware uses this as an internal signal that the queue has been updated. The cache line words can also include an Offset pointer to the next entry in the queue or some other indicator. By again obtaining a copy of the cache line, the data is returned and the alert is re-enabled. The software may have written multiple entries on the queue before the new copy was requested due to HCA workload. The other information in the cache line may contain counters or other data that maybe useful in processing the queue entries. A control type cache line is assigned to each queue.

Any cache line may be used, so the software only needs to pin the users normal page, register the virtual address with the HCA, and register a cache line within the addressed page as the header. The HCA will then request a copy and wait for the snoop operation. Because the logic is much like the normal cache logic in the HCA hardware, this function is easily integrated into the cache controller logic. Many cache lines can be maintained as copies. A platform that has a directory/snoop filter that can cover the full size of outstanding cached lines eliminates the unnecessary snoop/purge due to filter space age out. Simply deregistering the cache line and the HCA will ignore future snoops (except to honor the protocol).

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 8 is a detailed diagram showing the alternative queue comparison approach.

DETAILED DESCRIPTION OF THE PREFERRED EMBODIMENTS

Figure 1:
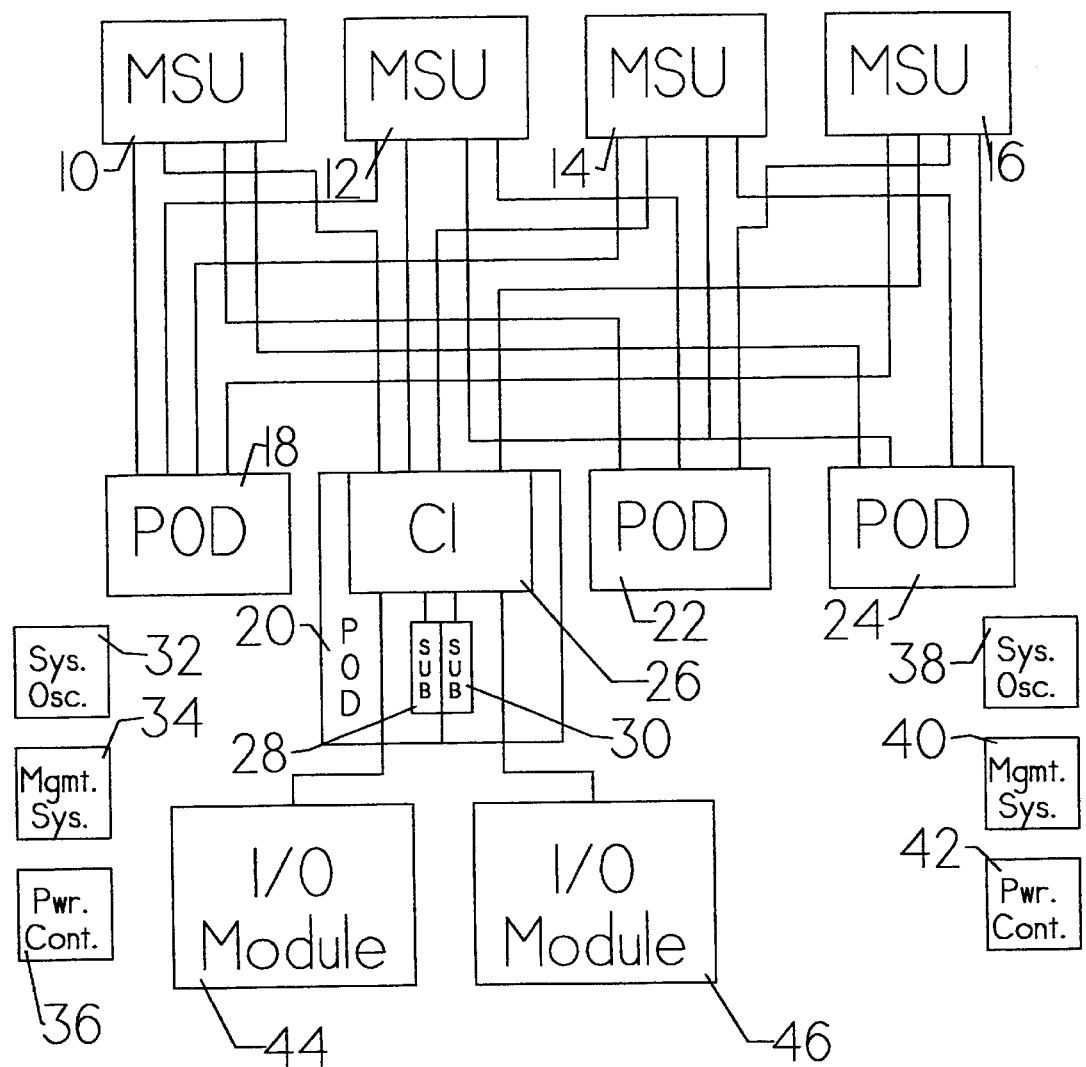
FIG. 1 is an overall block diagram of a fully populated system in accordance with the present invention.

FIG. 1 is an overall block diagram of fully populated data processing system according to the preferred mode of the present invention. This corresponds to the architecture of a commercial system of Unisys Corporation termed "Voyager".

The main memory of the system consists of up to four memory storage units, MSU 10, MSU 12, MSU 14, and MSU 16. Being fully modular, each of these four memory storage units is "stand-alone" and independent of one another. Each has a separate point-to-point dedicated bi-directional interface with up to four "pods", POD 18, POD 20, POD 22, POD 24. Again, each of the up to four pods is separate and independent of one another.

The contents of POD 20 are shown by way of example. For the fully populated system, POD 18, POD 22, and POD 24 are identical to POD 20. The interface between POD 20 and each of the four memory storage units (i.e., MSU 10, MSU 12, MSU 14, and MSU 16), is via a third level cache memory designated cached interface, CI 26, in this view. CI 26 couples with two input/output controllers, I/O Module 44 and I/O Module 46, and two sub-pods, SUB 28 and SUB 30. A more detailed explanation of the POD 20 is provided below.

The above described components are the major data handling elements of the system. In the fully populated system shown, there are sufficient components of each type, such that no single hardware failure will render the complete system inoperative. The software employed within the preferred mode of the present system utilizes these multiple components to provide enhanced reliability for long term operation.

The remaining system components are utilitarian rather than data handling. System Oscillator 32 is the primary system time and clocking standard. Management System 34 controls system testing, maintenance, and configuration. Power Controller 36 provides the required electrical power. System Oscillator 38, Management System 40, and Power Controller 42 provide completely redundant backup capability.

Figure 2:
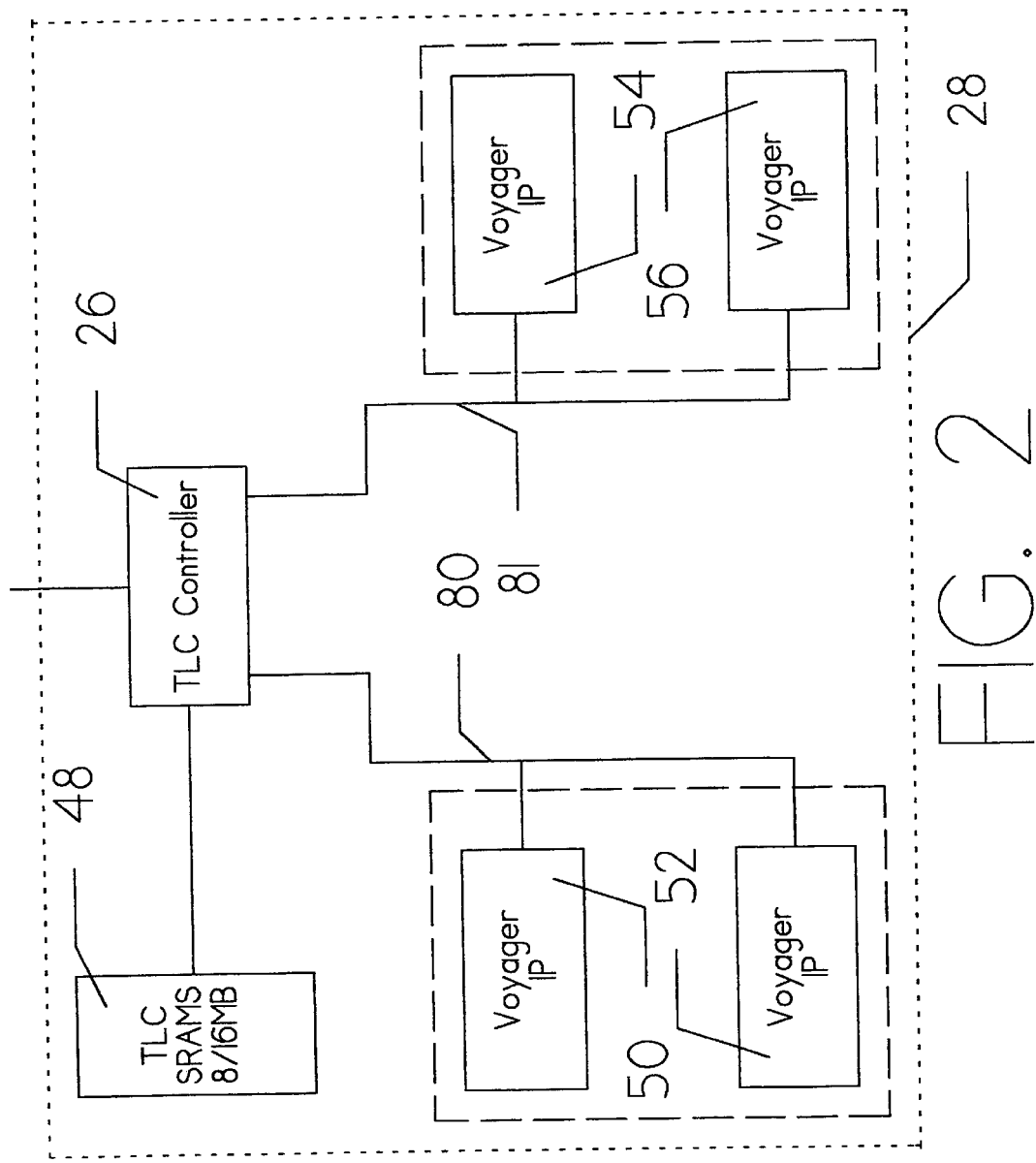
FIG. 2 is a schematic block diagram of one pod.

FIG. 2 is a more detailed block diagram of POD 20. The level three cache memory interfaces directly with the memory storage units via TLC Controller 26 (see also FIG. 1). The actual storage for the level three cache memory is TLC SRAMS 48. As indicated this static random access memory consists of eight 16 byte memory chips.

Subpod 28 and subpod 30 each contain up to two individual instruction processors. These are designated Voyager IP 50, Voyager IP 52, Voyager IP 54, and Voyager IP 56. As explained in detail below, each contains its own system controller. In accordance with the preferred mode of the present invention, these instruction processors need not all contain an identical software architecture.

Figure 3:
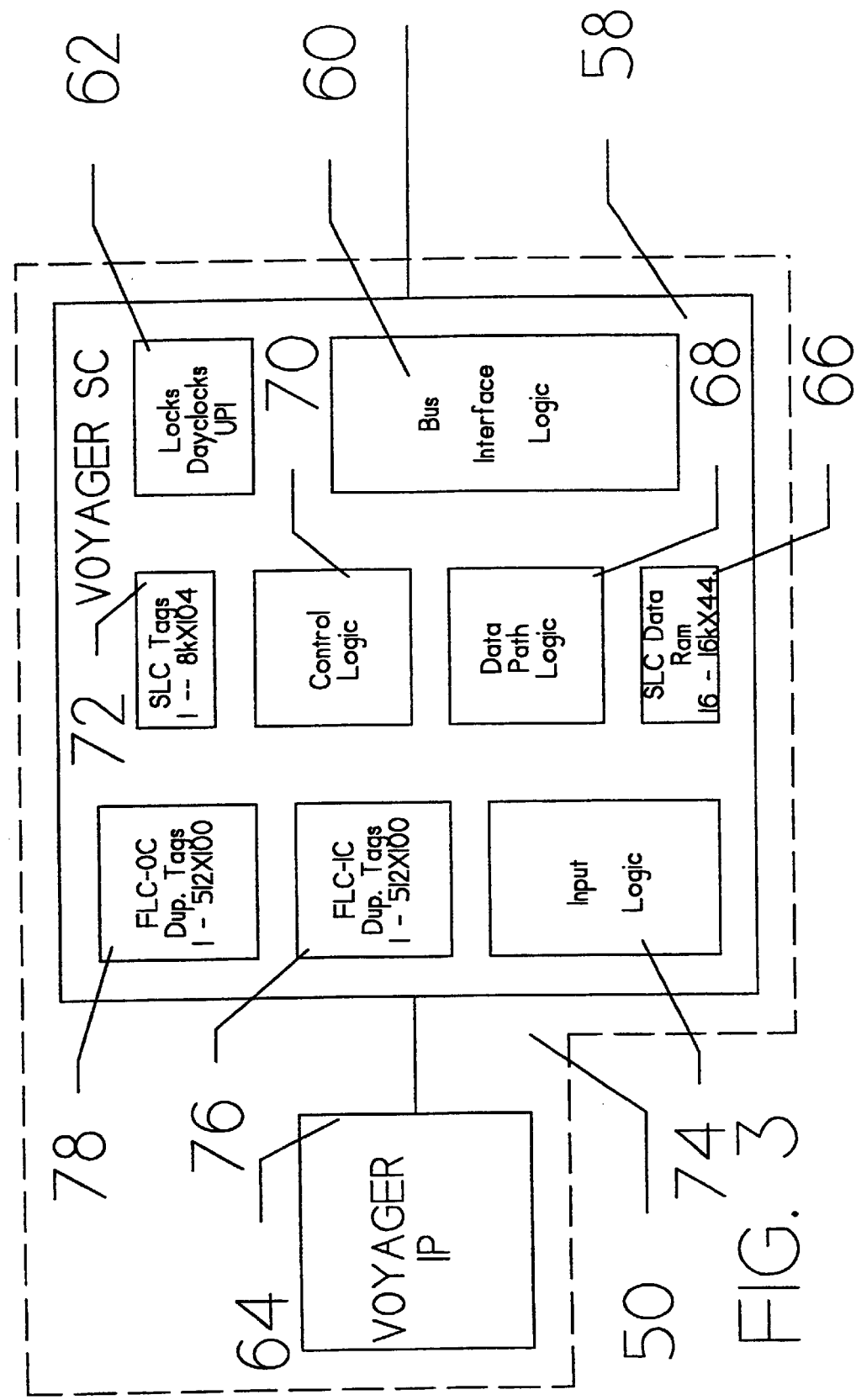
FIG. 3 is a schematic block diagram of one instruction processor along with its dedicated system controller.

FIG. 3 is a more detailed block diagram of Voyager IP 50, located within Subpod 28, located within POD 20 (see also FIGS. 1 and 2). As explained above, each instruction processor has a dedicated system controller having a dedicated level two cache memory. Instruction processor 64 has two dedicated level one cache memories (not shown in this view). One level one cache memory is a read-only memory for program instruction storage. Instruction processor 64 executes its instructions from this level one cache memory. The other level one cache memory (also not shown in this view) is a read/write memory for operand storage.

Instruction processor 64 is coupled via its two level one cache memories and dedicated system controller 58 to the remainder of the system. System controller 58 contains input logic 74 to interface with instruction processor 64. In addition, data path logic 70 controls movement of the data through system controller 58.

The remaining elements of system controller 58 provide the level two cache memory functions. SLC data ram 66 is the data actual storage facility. Control logic 70 provides the cache management function. SLC tags 72 are the tags associated with the level two cache memory. FLC-IC Dup. Tags 76 provides the duplicate tags for the level one instruction cache memory of instruction processor 64. Similarly, FLC-OC Dup. Tags 78 provides the duplicate tags for the level one operand cache memory of instruction processor 64. For a more complete discusses of this duplicate tag approach, reference may be made with the above identified co-pending and incorporated U.S. Patent Application.

Figure 4:
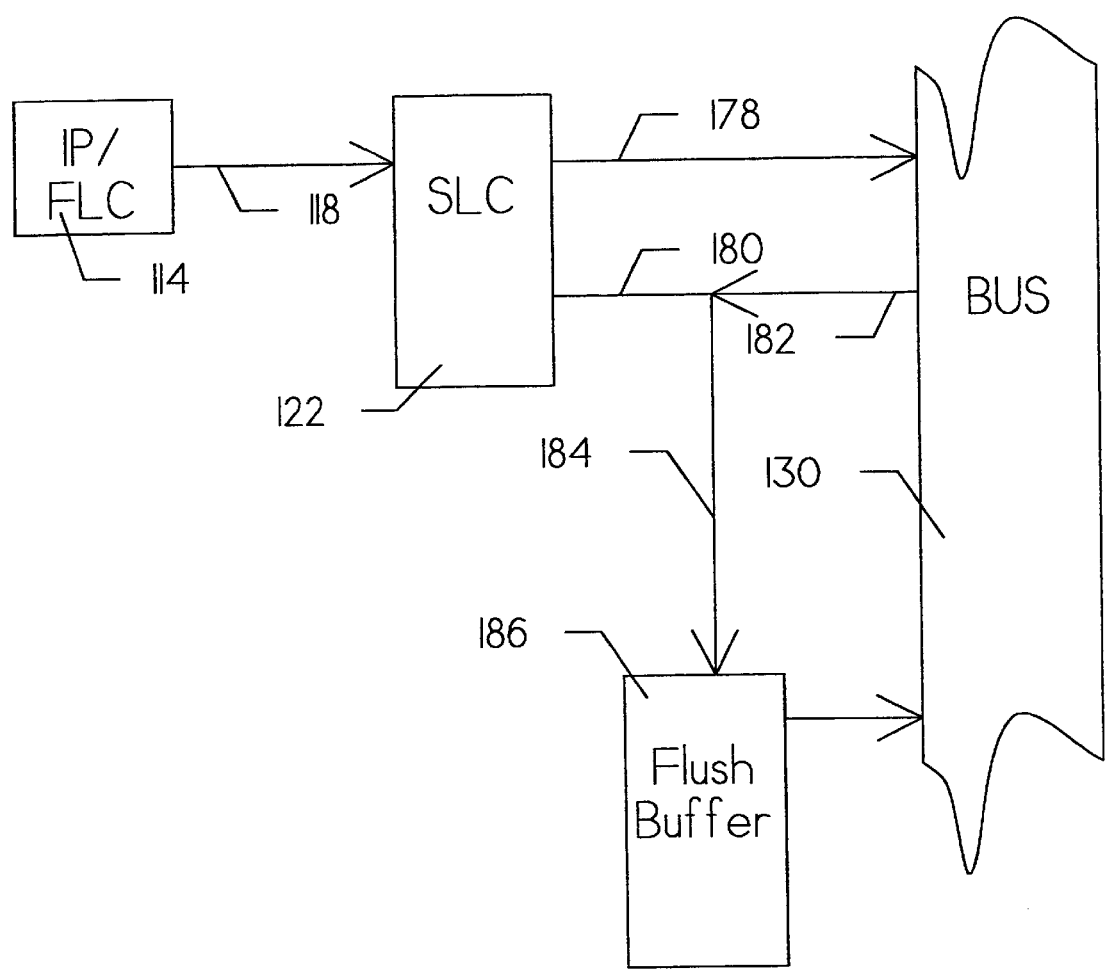
FIG. 4 is a detailed diagram of the flush process.

FIG. 4 is a detailed functional diagram showing the flushing process of the preferred mode of the present invention. Following a level one cache memory miss, a data request is made from level one operand cache memory 114 of instruction processor 110 (see also FIG. 3). In accordance with the present invention, the data request is made on memory bus 118.

If the requested data is found within second level cache memory 122 (i.e., a cache hit), the data access occurs. However, if a cache miss occurs within second level cache memory 122 (i.e., the data is not present), a level three cache memory request is made via path 178 and memory bus 130. As soon as the data is available, it is transferred from memory bus 130 via path 180.

To provide a place to store the newly requested data, cache memory 122 may need to flush some older data, if all locations are full. The selection of which location(s) to flush is in accordance with a least recently used algorithm as modified in accordance with the above identified and incorporated co-pending patent applications. The data to be flushed is transferred to flush buffer 186 from which the data is rewritten to level three memory via bus 130. Because this data is flushed from level two cache memory 122 to flush buffer 186 before the rewrite can be accomplished, space becomes quickly available within level two cache memory 122 for accommodating the newly requested data as soon as available.

Figure 5:
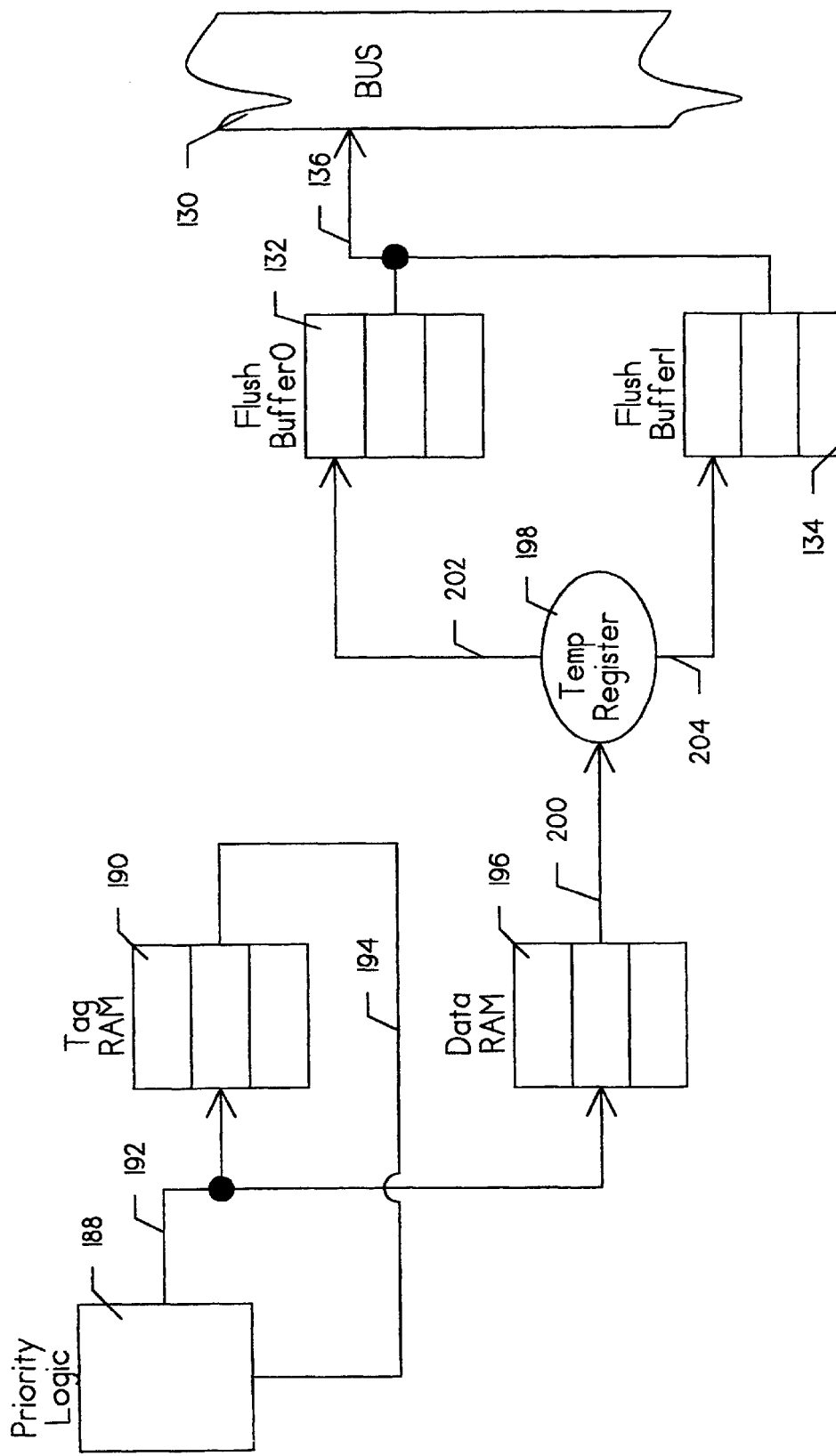
FIG. 5 is a detailed diagram showing the flush buffers.

FIG. 5 is detailed diagram showing the data flow in accordance with the preferred architecture. Upon being notified of a level two cache miss, priority logic 188 determines which locations are to be flushed. This selection is made in the manner discussed above. The location(s) to be flushed is communicated to tag RAM 190 and data RAM 196 via addressing path 192.

Access of tag RAM 190 provides a determination whether there has been any modification to the data within level two cache memory. If there has been no modification as noted within tag RAM 190, no further write operation to level three memory is required. If the data has been modified, however, path 194 notifies priority logic 188 that the modified data to be flushed must be rewritten to level three memory.

Assuming that a rewrite is necessary, the data is accessed from data RAM 196 and transferred via path 200 to temp register 198. Further latency is reduced by employing two flush buffers (i.e., flush buffer0 132 and flush buffer1 134) as shown. Temp register 198 routes the data to be rewritten to either flush buffer0 132 via path 202 or to flush buffer1 134 as each becomes available.

The data to be flushed is stored within the selected flush buffer while the rewriting process is accomplished. The data to transferred to level three memory via path 136 and bus 130.

Figure 6:
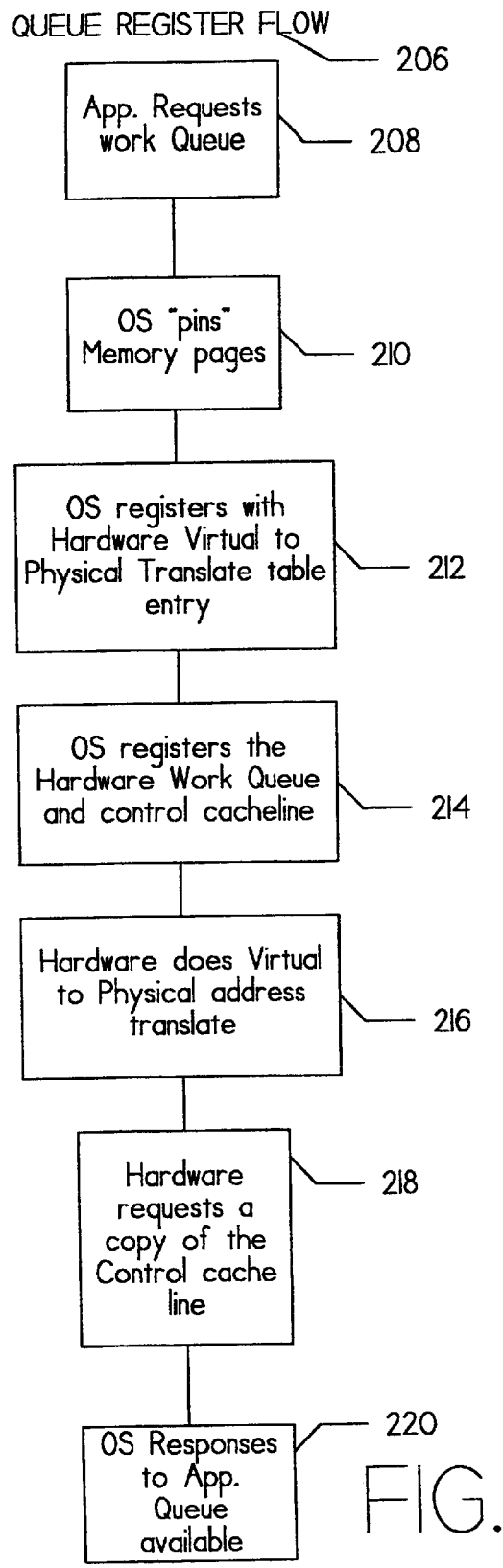
FIG. 6 is a detailed diagram of the Doorbell register flow.

FIG. 6 is a detailed diagram showing register flow 206 in accordance with the operation of the preferred mode of the present invention. At element 208, an application requests a work queue. The operating system assigns the appropriate memory pages for the work queue at element 210.

The operating system registers with the hardware virtual-to-physical translate table entry at element 212. Furthermore at element 214, the operating system registers with the hardware work queue and control cacheline.

The virtual-to-physical address translation is accomplished by the hardware at element 216. Whereupon the hardware requests a copy of the control cache line at element 218. The operating system completes its response to the availability of the application work queue at element 220.

Figure 7:
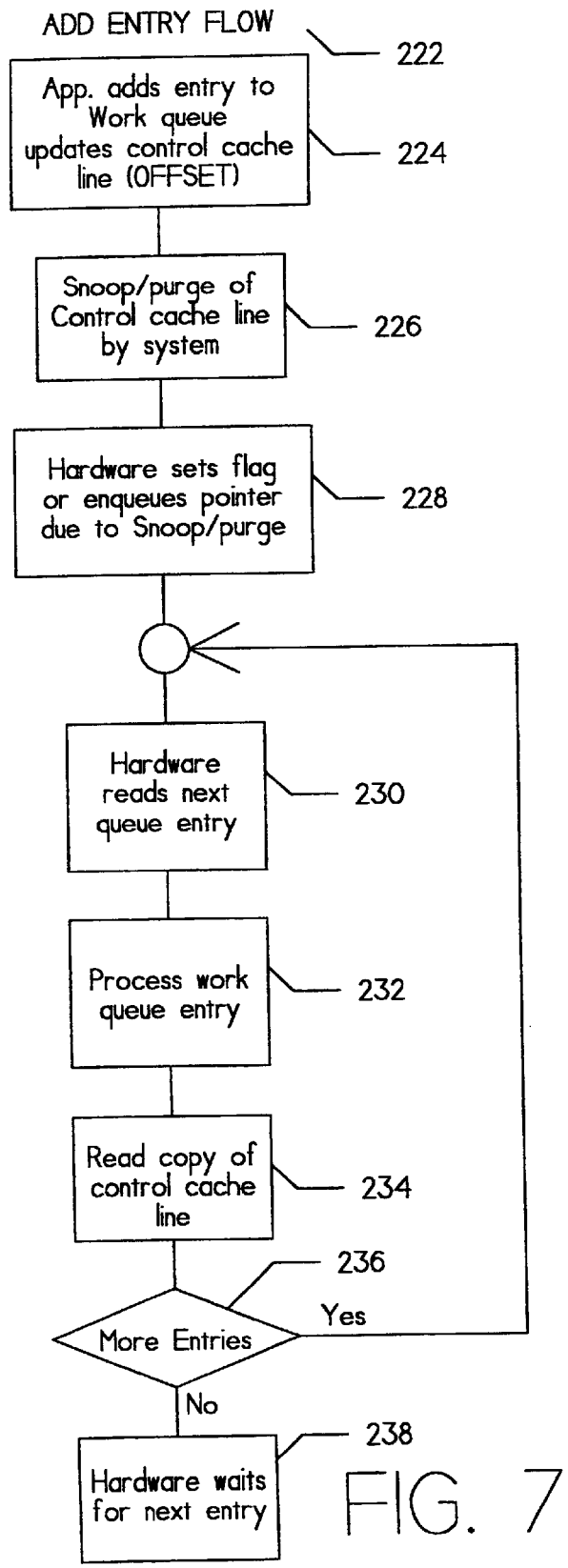
FIG. 7 is a detailed diagram of the Add entry flow.

FIG. 7 is a detailed flow diagram 222 showing the addition of the entry to the work queue. At element 224 the application adds the entry to the assigned work queue updating the control cache line. A snoop/purge of the control cache line is accomplished by the system at element 226. At element 228, the hardware sets a flag or enqueues pointer due to the snoop/purge.

The hardware reads the next queue entry at element 230. The work queue entry is processed at element 232. At element 234 the copy of the control cache line is read.

At element 236, a determination is made whether all entries have been processed. If not, control is given to element 230 for processing of the next sequential entry. Otherwise control is give to element 238 whereby the hardware awaits the creation of another work queue entry.

FIG. 8 is a detailed flow diagram of an alternative approach to the utilization of a single header cache line. In this embodiment the HCA keeps a copy of the last entry of a linked list queue. The alert occurs when a new entry is linked to the last entry. Multiple entries can be queued, and the HCA follows the links until it runs out (i.e., forward link equals zero) before it awaits a new alert. This approach requires a fixed entry header format in which the software is not permitted to update the cache line of the link until it adds a new entry to avoid thrashing.

A circular queue 240 which consists of fixed size entries 244, 246, 248, and 250 with some type of Valid indicator, stored in consecutive address locations can operate with this invention by the hardware keeping a copy of the control cache line 242 that holds the pointer of the next available queue entry. The hardware is informed each time the entry offset pointer is updated by the software.

A link list queue which consists of fixed size entries 252, 254, 256, and 258 with forward and backward link addresses can be scattered through out memory. The hardware is informed of a new entry by keeping a copy of the cache line that contains the forward pointer of the last entry processed when the end of the list is detected (pointer equal zero). This requires no additional memory writes for doorbells because the normal operation of adding the entry to the queue causes the forward pointer to be modified.

Having thus described the preferred embodiments in sufficient detail for those of skill in the art to make and use the present invention, those of skill in the art will be readily able to apply the teachings found herein to yet other embodiments within the scope of the claims hereto attached.

We claim:

1. In a data processing system with a main system memory and having a work queue located within said main system memory having a cache memory and having a cache memory coherency facility with a cache line which indicates a store operation to a memory location associated with said cache memory, the improvement comprising:
   a. a scheduling facility responsively coupled to said cache line which informs said data processing system of an entry into said work queue in response to said cache line indicating a store operation to said memory location.

2. A data processing system according to claim 1 wherein said cache memory coherency facility employs Modified/Exclusive/Shared/Invalid (MESI) cache coherency protocol.

3. A data processing system according to claim 2 wherein said scheduling facility further comprises a doorbell interface.

4. A data processing system according to claim 3 further comprising a Host Channel Adaptor (HCA) located within said data processing system wherein said scheduling facility is a portion of said HCA.

5. A data processing system according to claim 4 wherein said HCA is an Infiniband Host Channel Adaptor.

6. A data processing system comprising:
   a. A main system memory containing a work queue;
   b. A cache memory;
   c. A cache memory line responsively coupled to said cache memory which indicates a store operation at a location associated with said cache memory; and
   c. A scheduler responsively coupled to said work queue and said cache memory line which signals an entry into said work queue in response to said cache memory line indicating a store operation at said location.

7. A data processing system according to claim 6 further comprising a cache memory coherency facility including said cache memory line.

8. A data processing system according to claim 7 wherein said cache memory coherency facility employs Modified/Exclusive/Shared/Invalid (MESI) cache coherency protocol.

9. A data processing system according to claim 8 wherein said cache memory coherency facility further comprises a Host Channel Adaptor (HCA).

10. A data processing system according to claim 9 wherein said scheduler further comprises a doorbell type interface.

11. A method of scheduling with a data processing system having a cache memory coherency facility comprising:
   a. monitoring said cache memory coherency facility for storage of data into a work queue; and
   b. generating a doorbell type interface indication of a new entry in said work queue in response to said monitoring step.

12. A method according to claim 11 wherein said cache memory coherency facility further comprises Modified/Exclusive/Shared/Invalid protocol.

13. A method according to claim 12 wherein said generating step provides said doorbell type interface indication to a Host Channel Adaptor (HCA).

14. A method according to claim 13 wherein said Host Channel Adaptor further comprises an Infiniband Host Channel Adaptor.

15. A method of scheduling with a data processing system having a cache memory coherency facility comprising:
   a. monitoring said cache memory coherency facility for storage of data into a work queue;
   b. generating a doorbell type interface indication of a new entry in said work queue in response to said monitoring step;
   c. wherein said cache memory coherency facility further comprises Modified/Exclusive/Shared/Invalid protocol;
   d. wherein said generating step provides said doorbell type interface indication to a Host Channel Adaptor (HCA);
   e. wherein said Host Channel Adaptor further comprises an Infiniband Host Channel Adaptor; and
   f. wherein said generating step further comprises providing an offset pointer.

16. A data processing apparatus comprising:
   a. queuing means for queuing application service requests;
   b. storing means for storing cache memory data;
   c. indicating means responsively coupled to said storing means for indicating a store operation at a location associated with said storing means; and
   d. signaling means responsively coupled to said queuing means and said indicating means for signaling an entry into said queuing means in response to said indicating means indicating a store operation at said location.

17. An apparatus according to claim 16 wherein said indicating means further comprises Modified/Exclusive/Shared/Invalid protocol.

18. An apparatus according to claim 17 wherein said signaling means further comprises a Host Channel Adaptor (HCA).

19. An apparatus according to claim 18 wherein said signaling means further comprising means for providing a doorbell type interface.

20. An apparatus according to claim 19 wherein said signaling means further comprises an Infiniband Host Channel Adaptor.

21. An apparatus for managing data storage and transfers within a system having cached memory comprising:
   a. a main system memory;
   b. a work queue located within said main system memory;
   c. a cache memory;
   d. a cache memory line responsively coupled to said cache memory which indicates a store operation at a location associated with said cache memory;
   e. a scheduler responsively coupled to said work queue and said cache memory line which signals an entry into said work queue in response to said cache memory line indicating a store operation at said location; and
   f. an offset pointer generated by said scheduler which indicates location of said entry.

22. An apparatus according to claim 21 further comprising an application program located within an area of said main system memory corresponding to said application program.

23. An apparatus according to claim 22 wherein said work queue is located within area of said main system memory corresponding to said application program.

24. An apparatus according to claim 23 wherein said scheduler further comprises a doorbell type interface which signals said entry.

25. An apparatus according to claim 24 wherein said scheduler further comprises a Host Channel Adaptor.

* * * * *